(12) United States Patent
Liu

(10) Patent No.: US 10,386,991 B2
(45) Date of Patent: Aug. 20, 2019

(54) METHOD FOR SETTING ICON, AND ELECTRONIC DEVICE

(71) Applicant: Huawei Technologies Co., Ltd., Shenzhen, Guangdong (CN)

(72) Inventor: Zhu Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 15/601,738

(22) Filed: May 22, 2017

(65) Prior Publication Data
US 2017/0336944 A1    Nov. 23, 2017

(30) Foreign Application Priority Data

May 23, 2016 (CN) .......................... 2016 1 0349703

(51) Int. Cl.
*G06F 3/0482* (2013.01)
*G06F 3/0484* (2013.01)
*G06F 3/0488* (2013.01)
*G06F 3/0486* (2013.01)
*G06F 3/0481* (2013.01)

(52) U.S. Cl.
CPC ........ *G06F 3/04817* (2013.01); *G06F 3/0482* (2013.01); *G06F 3/0486* (2013.01); *G06F 3/0488* (2013.01); *G06F 3/04842* (2013.01); *G06F 3/04883* (2013.01)

(58) Field of Classification Search
CPC ............. G06F 3/04817; G06F 3/04842; G06F 3/04883; G06F 3/0488; G06F 3/0486; G06F 3/0482
See application file for complete search history.

(56) References Cited

U.S. PATENT DOCUMENTS

| 8,423,911 | B2 | 4/2013 | Chaudhri |
| 2004/0179033 | A1* | 9/2004 | Yu .......................... G06F 3/0482 715/734 |
| 2007/0157089 | A1* | 7/2007 | Van Os ............... G06F 3/04817 715/702 |
| 2009/0058821 | A1 | 3/2009 | Chaudhri et al. |
| 2009/0122018 | A1* | 5/2009 | Vymenets ........... G06F 3/04817 345/173 |

(Continued)

FOREIGN PATENT DOCUMENTS

| CN | 101836182 A | 9/2010 |
| CN | 102033710 A | 4/2011 |

(Continued)

*Primary Examiner* — Amy M Levy

(57) ABSTRACT

A method includes: receiving a first operation of a user, where the first operation controls an icon of an electronic device to enter an editing state; receiving a second operation of the user, where the second operation controls a first icon to move along a first track; determining a correlation between the first icon and another icon during the movement of the first icon along the first track; and after the first icon is most correlated with a second icon, continuing, by the second operation, to control the first icon to move away from the second icon along a second track, and when the first icon is most correlated with the second icon again along a third track, moving the first icon to a location of the second icon and moving the second icon to another location.

16 Claims, 12 Drawing Sheets

(56) References Cited

U.S. PATENT DOCUMENTS

| | | | |
|---|---|---|---|
| 2009/0178008 A1* | 7/2009 | Herz | G06F 3/04817 715/840 |
| 2009/0315867 A1* | 12/2009 | Sakamoto | G06F 3/03547 345/184 |
| 2011/0035691 A1* | 2/2011 | Kim | G06F 3/04817 715/765 |
| 2011/0093778 A1* | 4/2011 | Kim | G06F 3/041 715/702 |
| 2011/0116769 A1* | 5/2011 | Sugiyama | G06F 3/0481 386/282 |
| 2011/0249074 A1 | 10/2011 | Cranfill et al. | |
| 2011/0281619 A1* | 11/2011 | Cho | G06F 3/04817 455/566 |
| 2012/0084692 A1* | 4/2012 | Bae | G06F 3/04817 715/769 |
| 2013/0050109 A1 | 2/2013 | Ban | |
| 2013/0050119 A1* | 2/2013 | Nemoto | G06F 3/0488 345/173 |
| 2014/0013254 A1 | 1/2014 | Hosein | |
| 2014/0165006 A1* | 6/2014 | Chaudhri | G06F 3/04817 715/835 |
| 2015/0089421 A1* | 3/2015 | Kagei | G06F 3/0488 715/769 |
| 2015/0227285 A1* | 8/2015 | Lee | G06F 3/04817 715/765 |
| 2016/0188161 A1* | 6/2016 | Toussaint | G06F 3/0482 715/765 |

FOREIGN PATENT DOCUMENTS

| | | |
|---|---|---|
| CN | 103076942 A | 5/2013 |
| CN | 103995647 A | 8/2014 |
| CN | 104238877 A | 12/2014 |
| CN | 105117098 A | 12/2015 |
| EP | 2565767 B1 | 3/2013 |
| EP | 2565769 A2 | 3/2013 |
| EP | 3190502 A1 | 7/2017 |

* cited by examiner

METHOD FOR SETTING ICON, AND ELECTRONIC DEVICE

CROSS-REFERENCE TO RELATED APPLICATION

This application claims priority to Chinese Patent Application No. 201610349703.4, filed on May 23, 2016, which is hereby incorporated by reference in its entirety.

TECHNICAL FIELD

The present invention relates to the field of electronic technologies, and in particular, to a method for setting an icon, and an electronic device.

BACKGROUND

Generally, folders, various application programs, and icons of files are set in a user interface on an electronic device such as a smartphone or a computer, so that a user may perform a drag operation on an icon to readjust an icon layout in the interface.

In the prior art, when a user long presses an icon on a home screen, an icon editing mode is triggered. In the icon editing mode, the user may drag the icon. When a dragging speed is less than a specified value, a system determines that the user stops dragging, and at this time, starts to calculate distances between a center point of the dragged icon and locations nearby that are used to display an icon, to find a target location closest to the center point. When a distance between the dragged icon and the target location is greater than a preset threshold, an operation of replacing or pushing away an icon at the target location is performed. When a distance between the dragged icon and the target location is less than the preset threshold, an operation of integrating the icon at the target location and the dragged icon into a folder is performed. However, in an actual use process, the user cannot well control a movement speed and the distance between the dragged icon and the target location, resulting in that a feedback by the electronic device on an operation by the user deviates from an action actually expected by the user. For example, the user actually intends to perform an icon integration operation, but the electronic device performs a replacement operation because a dragging speed is less than a speed designed for a product. Therefore, the operation is inconsistent with an actual requirement of the user, resulting in degradation of use experience of the user.

SUMMARY

Embodiments of the present invention provide a method for setting an icon, and an electronic device, so as to reduce incorrect operations of a user and improve a capability of interacting with the user by the electronic device.

According to a first aspect, an embodiment of the present invention provides a method for setting an icon. The method is applied to an electronic device, and the method includes: displaying a user interface, where the user interface includes a first icon and a second icon; receiving a first operation of a user, where the first operation controls an icon of the electronic device to enter an editing state; receiving a second operation of the user, where the second operation controls the first icon to move along a first track; determining a correlation between the first icon and another icon during the movement of the first icon along the first track; and after the first icon is most correlated with the second icon, continuing, by the second operation, to control the first icon to move away from the second icon along a second track, and when the first icon is most correlated with the second icon again along a third track, moving the first icon to a location of the second icon and moving the second icon to another location. By means of this embodiment of the present invention, when an icon in the user interface is set, there is no need to consider a movement speed of an operation, but only a quantity of times when icons are most correlated is determined, and when a quantity of times is reached, two most correlated icons are integrated or replaced, thereby reducing incorrect operations by the user and improving a capability of interacting with the user by the electronic device.

In a possible implementation manner, the method further includes: when the first icon is most correlated with the second icon for the first time and the second operation is terminated, integrating the first icon and the second icon. The integrating the first icon and the second icon includes generating a folder, where the folder includes the first icon and the second icon. In this implementation manner of the present invention, when the first icon and the second icon are both application program icons or file icons, the integration refers to disposing the first icon and the second icon into a newly created folder icon; or when one of the first icon or the second icon is an application program icon and the other one is a folder icon, the integration refers to integrating the user program icon into the folder icon. By means of this embodiment of the present invention, it can be implemented that when an icon in the user interface is set, especially when an integration operation is performed on the icon, there is no need to determine a movement speed of an operation, but only a correlation between the icon and another icon during movement of the icon is determined, thereby reducing incorrect operations by the user and improving a capability of interacting with the user by the electronic device.

In some other possible implementation manners, that the first icon is most correlated with the second icon may specifically include: a center distance between the first icon and the second icon is the shortest compared with center distances between the first icon and other icons; or an overlapping area between the first icon and the second icon is the largest; or the first icon and the second icon are overlapped and a motion direction of the first track points to the second icon. By means of this embodiment of the present invention, it can be implemented that determining a correlation between icons by using a factor such as a distance or an overlapping area between the icons, or directivity of an icon during movement is more intuitive and accurate, thereby reducing incorrect operations by the user and improving a capability of interacting with the user by the electronic device.

In another possible implementation manner, a motion direction of the second track is opposite to the motion direction of the first track, and a motion direction of the third track is the same as the motion direction of the first track. By means of this embodiment of the present invention, during movement of an icon along the first track, the icon may be most correlated to different icons at different moments. However, only an icon that is most correlated and that moves away along a track different from the motion direction of the first track is considered as an icon to be replaced or to be pushed away, so that a direction of an operation can be more explicit, interference caused by similar operations can be reduced, incorrect operations by the user can be reduced, and a capability of interacting with the user by the electronic device can be improved.

In still another possible implementation manner, after the first icon is most correlated with the second icon, the method further includes: highlighting the second icon. By means of this embodiment of the present invention, an icon on which replacement or overlapping needs to be performed can be explicit, so that a user can determine whether an operation is correct, thereby reducing incorrect operations by the user and improving a capability of interacting with the user by the electronic device.

According to a second aspect, an embodiment of the present invention provides an apparatus for setting an icon. The apparatus includes: a receiving module, configured to receive a first operation of a user, where the first operation controls an icon of an electronic device to enter an editing state, where the receiving module is further configured to receive a second operation of the user, where the second operation controls a first icon to move along a first track; and a processing module, configured to determine a correlation between the first icon and another icon during the movement of the first icon along the first track, where the processing module is further configured to: after the first icon is most correlated with the second icon, continue, by the second operation, to control the first icon to move away from the second icon along a second track, and when the first icon is most correlated with the second icon again along a third track, move the first icon to a location of the second icon and move the second icon to another location.

In a possible implementation manner, the processing module is further configured to generate a folder when the first icon is most correlated with the second icon for the first time and the second operation is terminated, where the folder includes the first icon and the second icon.

In some other possible implementation manners, that the first icon is most correlated with the second icon may specifically include: a center distance between the first icon and the second icon is the shortest compared with center distances between the first icon and other icons; or an overlapping area between the first icon and the second icon is the largest; or the first icon and the second icon are overlapped and a motion direction of the first track points to the second icon.

In another possible implementation manner, a motion direction of the second track is opposite to the motion direction of the first track, and a motion direction of the third track is the same as the motion direction of the first track.

In still another possible implementation manner, the processing module is further configured to: after the first icon is most correlated with the second icon, highlight the second icon.

According to a third aspect, an embodiment of the present invention provides an electronic device. The electronic device includes: an input unit, configured to receive a first operation of a user, where the first operation controls an icon of the electronic device to enter an editing state, where the input unit is further configured to receive a second operation of the user, where the second operation controls the first icon to move along a first track; and a processor unit, configured to determine a correlation between the first icon and another icon during the movement of the first icon along the first track, where the processor unit is further configured to: after the first icon is most correlated with the second icon, continue, by the second operation, to control the first icon to move away from the second icon along a second track, and when the first icon is most correlated with the second icon again along a third track, move the first icon to a location of the second icon and move the second icon to another location.

In a possible implementation manner, the processor unit is further configured to generate a folder when the first icon is most correlated with the second icon for the first time and the second operation is terminated, where the folder includes the first icon and the second icon.

In some other possible implementation manners, that the first icon is most correlated with the second icon may specifically include: a center distance between the first icon and the second icon is the shortest compared with center distances between the first icon and other icons; or an overlapping area between the first icon and the second icon is the largest; or the first icon and the second icon are overlapped and a motion direction of the first track points to the second icon.

In another possible implementation manner, a motion direction of the second track is opposite to the motion direction of the first track, and a motion direction of the third track is the same as the motion direction of the first track.

In still another possible implementation manner, the processor unit is further configured to: after the first icon is most correlated with the second icon, highlight the second icon.

According to a fourth aspect, an embodiment of the present invention provides a storage medium, configured to store a computer software instruction used by the foregoing electronic device, where the instruction includes a program designed to perform the foregoing aspects.

By means of the embodiments of the present invention, it can be implemented that when moving an icon in a user interface, a user does not need to consider a speed at which the icon is moved, but only needs to control a quantity of times when a first icon and a second icon are most correlated, thereby facilitating an operation by the user, reducing incorrect operations by the user, and improving a capability of an electronic device to interact with the user.

BRIEF DESCRIPTION OF THE DRAWINGS

FIG. 2C-1 shows an example of a mobile phone during editing of a user interface;

FIG. 2C-2 shows another example of a mobile phone displaying a user interface;

FIG. 2C-3 shows another example of a mobile phone during editing of a user interface;

FIG. 2C-4 shows still another example of a mobile phone during editing of a user interface;

FIG. 2C-5 shows yet another example of a mobile phone during editing of a user interface;

FIG. 2D-1 shows yet another example of a mobile phone during editing of a user interface;

FIG. 2D-2 shows yet another example of a mobile phone during editing of a user interface;

FIG. 2D-3 shows yet another example of a mobile phone during editing of a user interface; and FIG. 3 is a flowchart of a method for setting an icon according to a method embodiment of the present invention.

DETAILED DESCRIPTION

Figure 1:
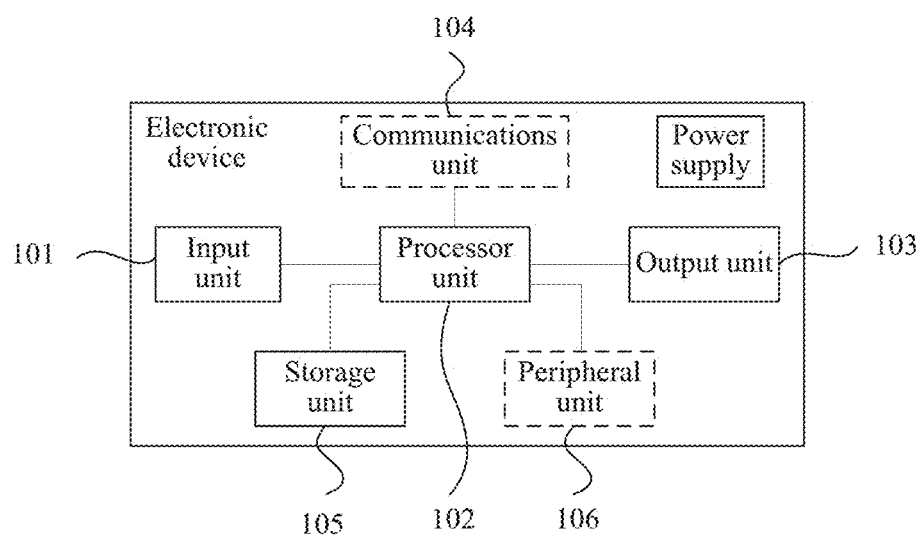
FIG. 1 shows an electronic device according to a specific implementation manner of the present invention.

The technical solutions of the present invention are further described in detail with reference to the accompanying drawings and the embodiments as follows:

It should be noted that in the embodiments of the present invention, a "first operation" may be an operation that controls a user interface to enter an editing state, for example, an operation of long pressing an icon in the user interface, or an operation of long pressing any location in the user interface, or may be an operation triggered by using a physical key or a virtual key (such as a shortcut key), or may be an operation of controlling a mouse cursor to click an icon, or may be an operation of inputting voice by using a microphone (for example, for an electronic device having a sound control function, the electronic device may be controlled by means of voice), or the like. A "second operation" may refer to an operation of dragging an icon in the user interface. "One operation" may refer to an operation performed by a user to complete a setting once, for example, a click, a drag, or the like in the user interface, or triggering a physical key, a virtual key, or the like once, or inputting voice once, or the like.

An "editing state" may refer to a state in which a user may set an icon in the user interface.

A "square" may refer to a part used to display an icon in the user interface. The user interface is divided into equal squares or is divided into squares by using another rule. Each square is used to display an icon. In a specific application, the squares may not be displayed in the user interface.

"Most correlated" may refer to that a center distance between a moving icon and another icon in the user interface is the shortest compared with distances between the moving icon and other icons; or refer to that an overlapping area between a moving icon and another icon is the largest compared with overlapping areas between the moving icon and other icons; or refer to that a moving icon and another icon are overlapped and a motion direction of the moving icon points to the another icon; or the like.

"Most correlated for the first time" may refer to that in one operation, a moving icon is most correlated with another icon, or a moving icon is most correlated with another icon in a motion direction, or the like.

A "center point of an icon" may be location coordinates of a center point of a square of an area in which the icon is located, or may be coordinates of a center point of a graphic of the icon, or the like. When the icon is not moved, the center point of the square in which the icon is located may be considered as the center point of the graphic of the icon in a current state.

A distance between areas and a distance between a point and an area may both be considered as minimum distances between points in areas. A distance between points may be determined by using location coordinates of the points in the user interface.

An "overlapping area" may refer to an overlapping area between a graphic of a first icon and a graphic of another icon, or an overlapping area between a graphic of a first icon and a square in which another icon is located, or an overlapping area between a graphic having a same shape as a square and using a center point of a first icon as a center point and a square in which another icon is located or a graphic of the another icon, or the like.

A "motion direction of a track" may refer to a direction of a connection line from a start point of the track to a current touch point of a user, or a direction deduced by a processor unit according to the track, or the like. For example, operation tracks of a user may be collected, a collected track having a highest coincidence degree is matched according to a current track, and a direction of a next touch point of the current track or a direction of a tangent line, of a current track point, to a track formed by previous track points is deduced according to the track.

A "first track", a "second track", and a "third track" are tracks having different motion directions in one operation.

The "first track", the "second track", and the "third track" may further have the following definitions:

a motion direction of the first track is opposite to a motion direction of the second track, and the motion direction of the first track is the same as a motion direction of the third track; and an end point of the first track may be a start point of the second track, and an end point of the second track may be a start point of the third track.

In an actual use process, because different users have different operation habits, in actual representations, the first track, the second track, and the third track may not be strict straight lines but may be arcs or curves. When it is determined whether the motion directions of the three tracks are opposite or the same, only approximately opposite or approximately the same may be determined. For example, when an angle between the motion direction of the first track and the motion direction of the second track in the user interface or on a plane on which a screen is located is greater than 90°, it is considered that the directions of the two tracks are opposite. Similarly, when an angle between the motion direction of the first track and the motion direction of the third track in the user interface or on the plane on which the screen is located is less than 90°, it is considered that the directions of the two tracks are the same.

It should be known that 90° is merely an example, other angles or technical solutions that can embody directions of two tracks all fall within the protection scope of the present invention.

An "angle between motion directions" may refer to an angle between motion directions in the user interface or on a plane on which a display is located.

It should be noted that in the embodiments of the present invention, descriptions such as "first" and "second" are merely for distinguishing and are not constructed as a limitation.

The electronic device disclosed in the present invention may be implemented as an independent apparatus, or may be integrated into various different electronic apparatuses such as a mobile phone, a tablet computer (Tablet Personal Computer), a laptop computer (Laptop Computer), a multimedia player, a digital camera, a personal digital assistant (personal digital assistant, PDA for short), a navigation apparatus, a mobile Internet device (Mobile Internet Device, MID), or a wearable device (Wearable Device).

In the embodiments of the present invention, the electronic device may include a display and an input unit. The display may display a user interface, where the user interface may include icons of one or more applications and/or icons of one or more folders. A user may control an icon in the user interface by inputting an operation by using the input unit. For example, by using the input unit, the user may delete or move an icon in the user interface; may also replace locations of icons in the user interface; and may place two icons into a folder, where an icon of the folder is displayed in the user interface, and the like. In a specific implementation manner of the present invention, a correspondence between a specific command and a quantity of times when an icon is most correlated with another icon during movement of the icon in one operation is determined in advance, so that when the icon is most correlated with the another icon for a quantity of times during the movement of the icon in one operation, a command corresponding to the quantity of times is triggered to be performed. For example, when the icon is most correlated with the another icon once during the movement of the icon in one operation, the icon and the another icon that is most correlated with the icon are placed into a folder, and an icon of the folder is displayed. When the icon is most correlated with the another icon twice during the movement of the icon in one operation and moving directions of the icon of the two correlations are the same, locations of the icon and the another icon that is most correlated with the icon twice are replaced; and the like.

FIG. 1 shows an electronic device according to a specific implementation manner of the present invention. The following uses the electronic device shown in FIG. 1 as an example for detailed description. As shown in FIG. 1, a mobile phone 100 includes components such as an input unit 101, a processor unit 102, an output unit 103, a communications unit 104, a storage unit 105, and a peripheral unit 106. The communications unit 104 and the peripheral unit 106 may be optional units. These components communicate with each other by using one or more buses. A person skilled in the art may understand that a structure of the electronic device shown in the figure does not limit the present invention. The structure may be bus-shaped, or may be star-shaped, or may include more or fewer components than those shown in the figure, or some components may be combined, or a different component deployment may be used.

The input unit 101 is configured to implement interaction between a user and the electronic device and/or input information to the electronic device. In some specific implementation manners of the present invention, the input unit 101 may be a touch panel and another human computer interaction structure, for example, a physical keyboard or a virtual keyboard configured to input a digit or a character, a physical input key configured to input a signal related to a user setting or function control, or a microphone and a camera that are configured to capture external information. The touch panel, also referred to as a touchscreen or a touchscreen, may collect a touch operation motion performed by a user on the touch panel or an operation motion close to the touch panel performed by a user, for example, an operation motion performed by the user on or close to the touch panel by using any suitable object or accessory such as a finger or a stylus, and a corresponding connection apparatus is driven according to a preset program. Optionally, the touch panel may include two parts: a touch detection apparatus and a touch controller. The touch detection apparatus detects a touch operation by a user, converts the detected touch operation into an electrical signal, and transmits the electrical signal to the touch controller. The touch controller receives the electrical signal from the touch detection apparatus, converts the electrical signal into coordinates of a touch point, and then sends the coordinates to the processor unit 102. The touch controller may also receive and execute a command sent by the processing unit. In addition, the touch panel may be a resistive, capacitive, infrared (Infrared), or surface acoustic wave touch panel. In another implementation manner of the present invention, the physical input key used by the input unit 101 may include, but is not limited to, one or more of a physical keyboard, a functional key (such as a volume control key or a switch key), a trackball, a mouse, or a joystick. The input unit in a microphone form may collect voice input by a user or an environment, and convert the voice into a command that is in an electrical-signal form and that may be executed by the processing unit.

In this embodiment of the present invention, a first operation of a user may be received by using any foregoing input unit 101. For example, the user may control a mouse cursor onto a first icon to trigger the first operation, or may trigger the first operation by long pressing a touch panel, or may trigger the first operation by using a specific state of a physical key, or the like. An input unit, such as a touch panel or a mouse, that can determine track-related information may be used to receive a second operation of the user, for example, to receive track information of a touch point of the user moving on the touch panel, that is, continuous touch points. After receiving the first operation of the user or the second operation of the user, the input unit 101 may send the first operation of the user or the second operation of the user to the processor unit 102. For example, the input unit 101 may send coordinates of a touch point of the second operation of the user to the processor unit 102.

In some other implementation manners of the present invention, the input unit 101 may also be various types of sensors, for example, a Hall element, configured to: detect physical quantities of the electronic device, such as a force, a force moment, a pressure, a stress, a location, a shift, a speed, an acceleration, an angle, an angular velocity, revolutions, a rotational speed, and a time when a working state changes; and convert the physical quantities to electric quantities for detection and control. Some other sensing devices may further include a gravity sensor, a tri-axis accelerometer, a gyroscope, and the like.

The processor unit 102 is a control center of the electronic device, and connects parts of the entire electronic device by using various interfaces and lines, and runs or executes a software program and/or module stored in the storage unit 105 and invokes data stored in the storage unit 105, to perform various functions of the electronic device and/or process data. The processor unit 102 may include an integrated circuit (Integrated Circuit, IC for short). For example, the processor unit 102 may include a single packaged IC or multiple packaged ICs having a same function or different functions. For example, the processor unit 102 may include only a central processing unit (Central Processing Unit, CPU for short), or may be a combination of a GPU, a digital signal processor (Digital Signal Processor, DSP for short), and a control chip (such as a baseband chip) that is in the communications unit 104. The CPU may be a single computing core, or may include multiple computing cores. In this embodiment of the present invention, after receiving the first operation of the user that is input by the input unit 101, the processor unit 102 controls the electronic device to enter an editing state of a user interface, and controls the output unit 103 to display the user interface in the editing state. After receiving the second operation of the user that is input by the input unit 101, a processor controls location replacement in the user interface between a first icon and a second icon that are specified by the second operation, or moves a specified first icon to a location of a specified second icon and moves the second icon to another location. The processor unit 102 may also control the output unit 103 to display the user interface after locations of the icons are changed. Alternatively, the processor unit 102 places the two icons into a folder, and controls the output unit 103 to display an icon of the folder in the user interface, and the like. The processor unit 102 may also control a display manner of the output unit 103, for example, control display of a particular area in a highlighted manner such as amplifying, highlighting, or haloing.

The output unit 103 includes, but is not limited to, an image output unit and a sound output unit. The image output unit is configured to output a text, an image, and/or a video. The image output unit may include a display panel, for example, a display panel configured by using an LCD (Liquid Crystal Display, liquid crystal display), an OLED (Organic Light-Emitting Diode, organic light-emitting diode), a field emission display (field emission display, FED), or the like. Alternatively, the image output unit may include a reflective display, for example, an electrophoretic (electrophoretic) display, or a display using a technology of interferometric modulation of light (Interferometric Modulation of Light). The image output unit may include a single display or multiple displays of different sizes. In a specific implementation manner of the present invention, the touch panel used by the input unit 101 may also be used as a display panel of the output unit 103. For example, after detecting a touch on the touch panel or a gesture operation near the touch panel, the touch panel transmits the touch or the gesture operation to the processing unit to determine a type of a touch event. Subsequently, the processing unit provides a corresponding visual output on the display panel according to the type of the touch event. Although in FIG. 1, the input unit 101 and the output unit are used as two separate components to implement input and output functions of the electronic device, in some embodiments, the touch panel and the display panel may be integrated to implement the input and output functions of the electronic device. For example, the image output unit may display various graphical user interfaces (Graphical User Interface, GUI) as virtual control components, which include, but are not limited to, a window, a scroll bar, an icon, and a clipboard, for the user to perform an operation by means of touch control. In this embodiment of the present invention, the output unit 103 includes at least the display panel, configured to display a corresponding user interface according to control by the processor unit 102.

In a specific implementation manner of the present invention, the image output unit includes a filter and an amplifier, which are configured to filter and amplify a video output by the processing unit. The audio output unit includes a digital-to-analog converter, configured to convert an audio signal output by the processing unit from a digital format into an analog format.

The storage unit 105 may be configured to store a software program and module. By running the software program and module stored in the storage unit 105, the processor unit 102 performs various functional applications of the electronic device and implements data processing. The storage unit mainly includes a program storage area and a data storage area. The program storage area may store an operating system, an application program required by at least one function, such as a sound play program or an image display program. The data storage area may store data (such as audio data or an address book) created according to use of the electronic device and the like. In a specific implementation manner of the present invention, the storage unit 105 may include a volatile memory, such as a nonvolatile dynamic random access memory (Nonvolatile Random Access Memory, NVRAM for short), a phase change random access memory (Phase Change RAM, PRAM for short), or a magnetoresistive random access memory (Magetoresistive RAM, MRAM for short), or may further include a nonvolatile memory, such as at least one magnetic storage device, an electrically erasable programmable read-only memory (Electrically Erasable Programmable Read-Only Memory, EEPROM for short), or a flash memory, for example, a NOR flash memory (NOR flash memory) or a NAND flash memory (NAND flash memory). The nonvolatile memory stores the operating system and the application program that are executed by the processing unit. The processor unit 102 loads a running program and data from the nonvolatile memory to memory, and stores digital content in a large scale storage apparatus. The operating system includes various components and/or drivers that are used for control and management of regular system tasks, such as memory management, storage device control, and power management, and that facilitate communication between various types of software and hardware. In this implementation manner of the present invention, the operating system may be an Android system of the Google company, an iOS system developed by the Apple company, a Windows operating system developed by the Microsoft company, or an embedded operating system such as VxWorks.

The application program includes any application installed on the electronic device, and includes, but is not limited to, a browser, an email, an instant messaging service, text processing, keyboard virtualization, a window widget (Widget), encryption, digital copyright management, speech recognition, voice replication, positioning (such as a function provided by a Global Positioning System), and music playback.

The electronic device may further include the following optional modules.

The communications unit 104 is configured to establish a communications channel, so that the electronic device connects to a remote server by using the communications channel and downloads media data from the remote server. The communications unit 104 may include a communications module, such as a wireless local area network (Wireless Local Area Network, wireless LAN) module, a Bluetooth module, or a baseband (Base Band) module, and a radio frequency (Radio Frequency, RF) circuit corresponding to the communications module, and is configured to perform wireless local area network communication, Bluetooth communication, infrared communication, and/or cellular communications system communication, for example, Wideband Code Division Multiple Access (Wideband Code Division Multiple Access, W-CDMA) and/or High Speed Downlink Packet Access (High Speed Downlink Packet Access, HSDPA). The communications module is configured to control communication between components in the electronic device, and may support direct memory access (Direct Memory Access).

Indifferent implementation manners of the present invention, communications modules in the communications unit 104 are generally presented in a form of integrated circuits (Integrated Circuit), and may be combined selectively, and the communications unit 104 does not necessarily include all the communications modules and corresponding antenna groups. For example, the communications unit 104 may include only the baseband chip, a radio frequency chip, and a corresponding antenna, so as to provide a communication function in a cellular communications system. By means of a wireless communications connection, such as wireless local area network access or WCDMA access, established by the communications unit, the electronic device may be connected to a cellular network (Cellular Network) and/or the Internet (Internet). In some optional implementation manners of the present invention, the communications modules, such as the baseband module, in the communications unit 104, may be integrated into the processor unit 102. An APQ (application processor only, not integrated baseband processor)+MDM (Mobile Station Modem, integrated baseband processor) series platform provided by the Qualcomm (Qualcomm) company is a typical example.

A radio frequency circuit is configured to receive and send a signal in an information receiving and sending process or during a call. For example, after downlink information of a base station is received, the downlink information is sent to the processor unit 102 for processing; and designed uplink data is sent to the base station. Usually, the radio frequency circuit includes a known circuit for performing these functions. The radio frequency circuit includes, but is not limited to, an antenna system, a radio frequency transceiver, one or more amplifiers, a tuner, one or more oscillators, a digital signal processor, a codec (Codec) chip set, a subscriber identity module (Subscriber Identity Module, SIM), and a storage. In addition, the radio frequency circuit may also communicate with a network and another device by means of wireless communication. The wireless communication may use any communications standard or protocol, which includes, but is not limited to, a GSM (Global System of Mobile communication, Global System for Mobile communications), a GPRS (General Packet Radio Service, general packet radio service), CDMA (Code Division Multiple Access, Code Division Multiple Access), WCDMA (Wideband Code Division Multiple Access, Wideband Code Division Multiple Access), High Speed Uplink Packet Access (High Speed Uplink Packet Access, HSUPA), LTE (Long Term Evolution, Long Term Evolution), an email, and an SMS (Short Messaging Service, short message service).

A power supply is configured to supply power to different components of the electronic device to maintain their operations. It is generally understood that, the power supply may be a built-in battery such as a common lithium-ion battery or a nickel-hydride battery; or may include an external power supply, such as an AC adapter, that directly supplies power to the electronic device. In some implementation manners of the present invention, the power supply may be defined in a wider scope. For example, the power supply may include a power management system, a charging system, a power fault detection circuit, a power converter or inverter, a power status controller (such as a light emitting diode), and any other component related to power generation, management, and distribution of the electronic device.

In an implementation manner of the present invention, when a user uses the electronic device, the input unit 101 obtains an operation of the user, including a long pressing operation or an operation on a particular key, converts the operation to a corresponding electrical signal for triggering, and transfers the electrical signal for triggering to the processor unit 102. The processor unit 102 controls, based on the trigger electrical signal, the electronic device to enter an editing state of a user interface, and controls the output unit 103 to display an icon in the editing state. In the editing state, the input unit 101 receives an operation of dragging a first icon, converts the operation to a corresponding electrical signal for dragging, and transfers the electrical signal for dragging to the processor unit 102. The processor unit 102 calculates, based on the electrical signal for dragging, a correlation between the moving first icon and another icon, where the correlation may be determined according to a factor such as an overlapping area or a distance between center points. In this implementation manner of the present invention, the operation of dragging the first icon includes a track of a touch point and a first direction of a track motion. In a dragging process, a second icon most correlated with the first icon is displayed in a highlighted manner, where the highlighted manner includes, but is not limited to, highlighting, amplifying, and haloing. After the input unit 101 detects that the operation is terminated (for example, a touch point on the input unit 101 disappears), the processor unit 102 integrates the first icon and the second icon into a folder (folder), and controls the output unit 103 to display an icon of the folder including the first icon and the second icon. In another implementation manner of the present invention, when the input unit 101 detects that the first icon is dragged away from the second icon along a second direction that is opposite to the first direction, and then the first icon is dragged to a location of the second icon along a third direction that is the same as the first direction, the first icon is most correlated with the second icon again. The processor unit 102 controls the first icon to move to the location of the second icon, and moves the second icon to another location, for example, to an original location of the first icon or an empty location on a current page.

To facilitate understanding of the embodiments of the present invention, the following further describes a method for setting an icon of a mobile phone as a specific embodiment with reference to the accompanying drawings. It should be understood that the mobile phone is merely an example of the electronic device for ease of description. The method for setting an icon is also applicable to another electronic device having a structure shown in FIG. 1, and this embodiment is not intended to limit the embodiments of the present invention.

The following further describes the present invention with reference to specific examples, FIG. 2A to FIG. 2D, and FIG. 3.

Figure 2A:
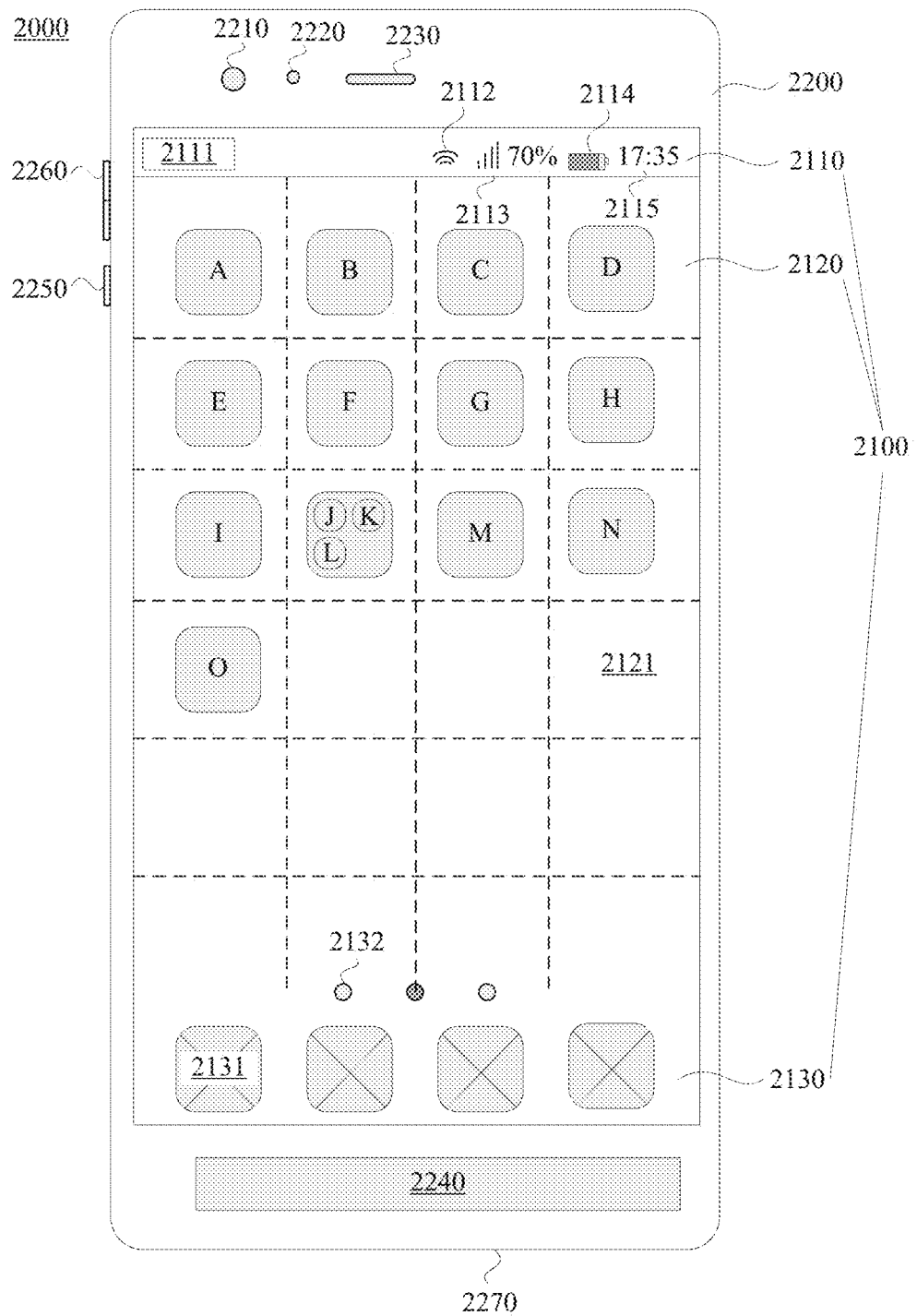
FIG. 2A shows an example of a mobile phone displaying a user interface.

FIG. 2A shows an example of a mobile phone displaying a user interface. FIG. 2A shows that the mobile phone 2000 includes a touchscreen 2100 and a housing 2200. The touchscreen 2100 may be an integration of a touch panel and a display panel, so as to implement input and output functions of the mobile phone 2000. Referring to step S310 in FIG. 3, the touchscreen 2100 displays the user interface. In this implementation manner of the present invention, the user interface includes a status bar area 2110, a first icon display area 2120, and a second icon display area 2130. In this process, the touchscreen 2100 not only functions as the input unit 101 shown in FIG. 1, but also functions as the output unit 103.

The status bar area 2110 displays one or more pieces of information such as an operator name 2111 (such as China Mobile or China Unicom), a Wi-Fi (Wireless-Fidelity, Wireless Fidelity) status control identifier 2112, a mobile communication signal status control identifier 2113, a battery level status control identifier 2114, or a local time 2115.

The first icon display area 2120 is used to display a turnable page, including icons A to O shown in FIG. 2A. Because the icon J, the icon K, and the icon L are included in a folder, the icons are displayed in a form of an icon of the folder. In this implementation manner, the icon of the folder includes thumbnails of the icon J, the icon K, and the icon L. An icon thumbnail refers to a small icon obtained after an icon is processed in a compression manner. The small icon usually has a connection pointing to the complete icon. In another implementation manner of the present invention, the thumbnails of the icon J, the icon K, and the icon L may not be displayed on the icon of the folder, and a user needs to open the icon of the folder in a manner such as clicking the icon of the folder to see icon content specifically included in the icon of the folder. In addition, in some implementation manners of the present invention, the first icon display area 2102 is divided into several equal squares 2121. The icons A to I, the icons M to O, and the icon of the folder including the icon J, the icon K, and the icon L are arranged in the squares 2121 in sequence. In a specific implementation manner of the present invention, the squares 2121 shown in FIG. 2A are merely for ease of description. In a specific application, the squares may not be displayed in the user interface.

The second icon display area 2130 is used to display one or more locked icons 2131. The locked icon 2131 may be an icon of a common application such as an icon of an SMS application and an icon of a dialling function. In an implementation manner of the present invention, the second icon display area 2130 also displays a status control identifier 2132 of a turnable page. The status control identifier 2132 may control information such as a quantity of turnable pages and an order of currently displayed pages.

The housing 2200 has a front-facing camera 2210, a photoreceptor 2220, a receiver 2230, a physical button 2240 (such as a HOME button, a menu button, or a back button), a power button 2250, a volume button 2260, a microphone 2270, and the like. Specific functions of the modules are similar to those in the embodiment shown in FIG. 1, and cross-reference may be made. It should be noted that the arrangement of the components in FIG. 2A is merely an example for description and cannot be interpreted as a design limitation to the present invention.

It should be noted that any icon in the icons A to O may represent any application such as a browser, an email, an instant message service, word processing, keyboard virtualization, a window widget (Widget), encryption, digital copyright management, speech recognition, voice replication, positioning (such as a function provided by a Global Positioning System), and music playback; or may also represent a folder including multiple icons.

It should be known that information such as shapes, locations, sizes, and quantities of functional modules, pages, and icons shown in FIG. 2A to FIG. 2D is merely for clarity of description and is merely examples, which are not construed as any limitation.

Figure 2B:
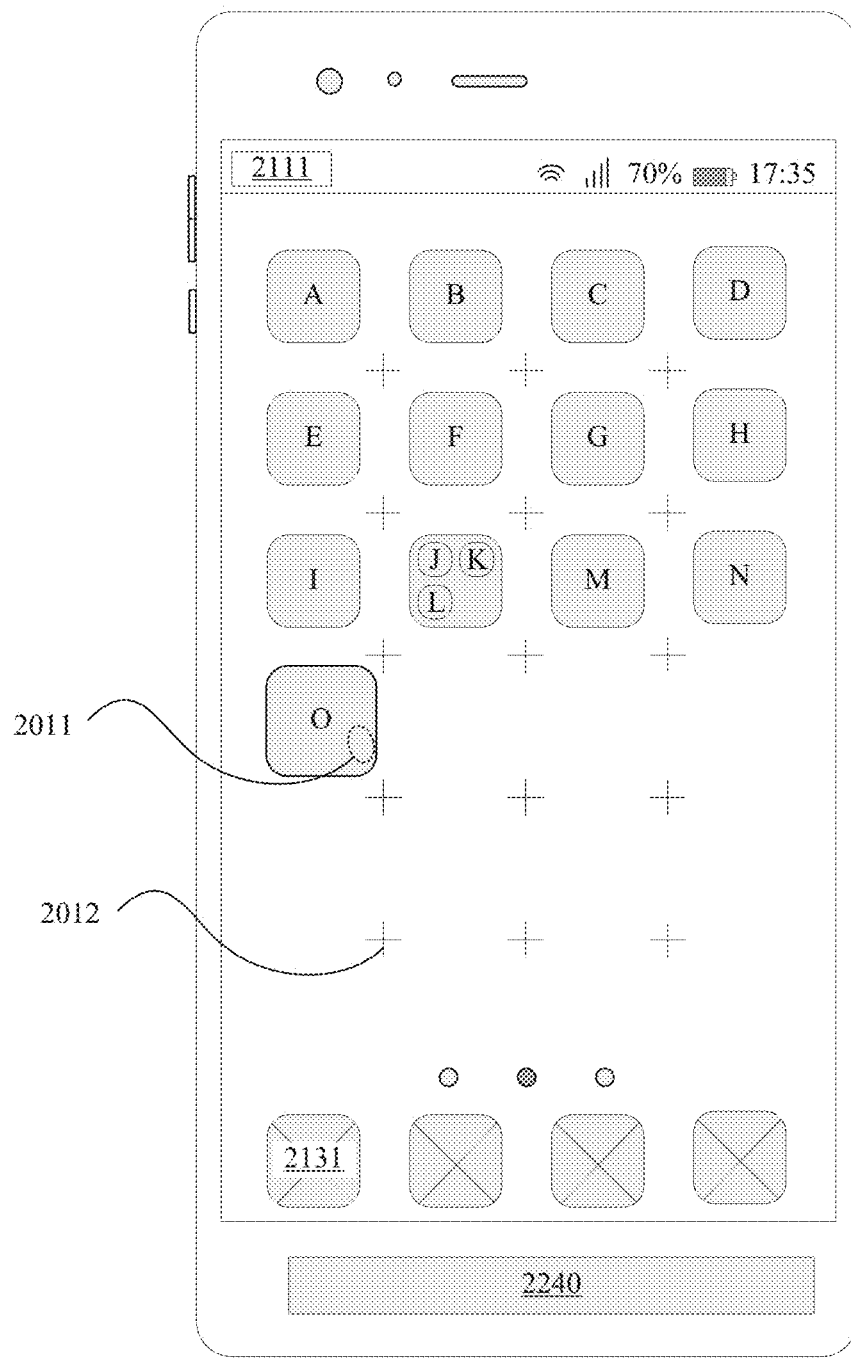
FIG. 2B shows an example of a mobile phone whose user interface enters an editing state.

FIG. 2B shows an example of a mobile phone whose user interface enters an editing state. Referring to step S320 in FIG. 3, the touchscreen 2100 receives an operation of long pressing an area in which the icon O is located, the long pressing operation is converted to an electrical signal for triggering, and the electrical signal for triggering is sent to the processor unit 102. The processor unit 102 controls, according to the electrical signal for triggering, the user interface to enter the editing state, and controls the touchscreen 2100 to display the user interface in the editing state. In the editing state, a user may edit an icon in the user interface.

In this embodiment of the present invention, the operation of long pressing the area in which the icon O is located of the user is defined as a first operation, and the icon O is defined as a first icon. The first operation may further include another manner such as long pressing a specified area or any area on the touchscreen 2100; or triggering the physical button 2240, the power button 2250, or the like; or receiving voice by using the microphone 2270. In this process, the foregoing touchscreen 2100, the physical button 2240, the power button 2250, the microphone 2270, or the like is the input unit 101 shown in FIG. 1.

A manner used by the touchscreen 2100 to display the user interface in the editing state may include a manner of displaying an edge 2012 of a square shown in FIG. 2B. The manner may also include another manner of prompting the user that the user interface is in the editing state, for example, displaying the user interface in a manner of blurring all icons in the user interface, or textually such as directly displaying "editable" in the user interface. In this embodiment of the present invention, there may be multiple manners of displaying an edge of a square, and only one manner is shown in FIG. 2B.

In addition, for the first operation on the specified first icon O, the mobile phone 2000 may display the first icon O in a highlighted manner. For example, when the area in which the icon O is located is long pressed, the mobile phone may display the first icon by amplifying, highlighting, or haloing the first icon.

Figures 1, 2C:
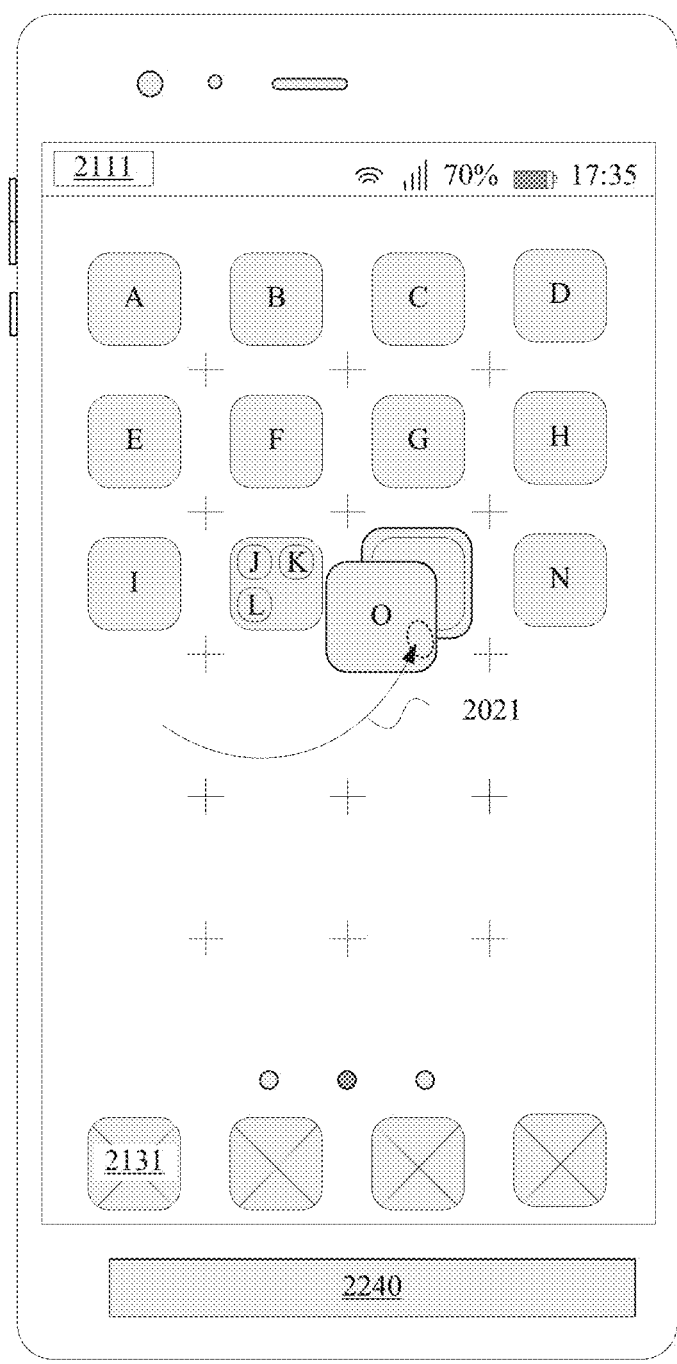

FIG. 2C-1 shows an example of a mobile phone during editing of a user interface. Referring to step S330a in FIG. 3, the touchscreen 2100 detects that a touch point of a user moves along a track 2021 on the touchscreen of the mobile phone, and sends information about real-time coordinates of the touch point of the user to the processor unit 102. The processor unit 102 determines, when the icon O following the touch point of the user moves close to the icon M, that is, the icons are most correlated, to control the touchscreen 2100 to display the icon M in a highlighted manner (such as highlighting or amplifying), so as to prompt the user that the icon O is most correlated with the icon M. The track 2021 is a track of the touch point of the user moving from a location of the icon O to a location of the icon M on the touchscreen 2100. The processor unit 102 may also control the icon O to dynamically follow the touch point of the user in the user interface according to the track 2021.

In this embodiment of the present invention, the icon O is a first icon and the track 2021 is a first track. Manners of determining a correlation between the first icon and another icon during the movement of the first icon along the first track are as follows:

Manner 1 is determining a distance between the touch point of the user and a center point of the another icon or a location of the another icon in the user interface during the movement of the first icon along the first track. A second icon closest to the touch point of the user is most correlated with the first icon. It should be noted that a center point of an icon may be location coordinates of a center point of a square of an area in which the icon is located, or coordinates of a center point of a graphic of the icon. When the icon is not moved, the center point of the square in which the icon is located may be considered as the center point of the graphic of the icon in a current state.

It should be noted that in this embodiment of the present invention, a distance between areas and a distance between a point and an area may both be considered as minimum distances between points in areas. A distance between points may be determined by using location coordinates of the points in the user interface.

Manner 2 is determining a distance between a center point or an area of the first icon and a center point or an area of the another icon during the movement of the first icon according to the first track. The closest second icon and first icon are most correlated.

Manner 3 is determining an overlapping area between the first icon and the another icon during the movement of the first icon according to the first track. A second icon having a largest overlapping area with the first icon is most correlated with the first icon. An overlapping area between the first icon and the another icon may refer to an overlapping area between a graphic of the first icon and a graphic of the another icon, an overlapping area between the graphic of the first icon and a square in which the another icon is located, or an overlapping area between a graphic having a same shape as a square and using the center point of the first icon as a center point and the square in which the another icon is located or the graphic of the another icon.

Manner 4 is determining, when the first icon and the second icon are overlapped and a motion direction of the first track points to the second icon, that the first icon is most correlated with the second icon.

Figures 2, 2C:
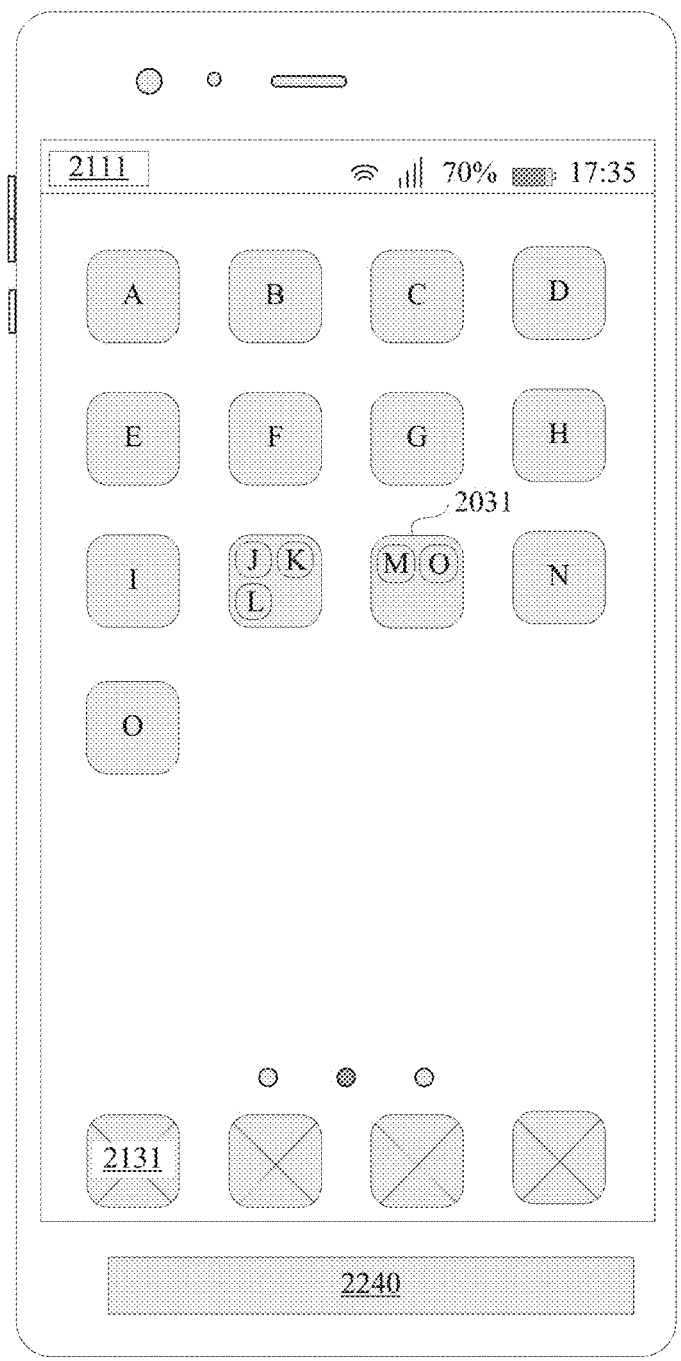

FIG. 2C-2 shows another example of a mobile phone displaying a user interface. Referring to step S330b in FIG. 3, when the icon O is most correlated with the icon M, the touchscreen 2100 determines that the touch point of the user disappears (the user leaves the touchscreen), and notifies the processor unit 102. The processor unit 102 integrates the icon O and the icon M. An integration of icons refers to that the processor unit 102 generates a folder 2031, where the folder includes the integrated icons, and the processor unit 102 controls the output unit 103 to display an icon of the folder in the user interface, where the icon of the folder may include thumbnails of the integrated icons.

By means of this embodiment of the present invention, there is no need to determine a movement speed of a touch point of a user, but a correlation between a moving icon and another icon needs to be determined, so that integration of icons may be implemented, thereby reducing incorrect operations by the user and improving a capability of interacting with the user by the electronic device.

Figures 2, 2C, 3:
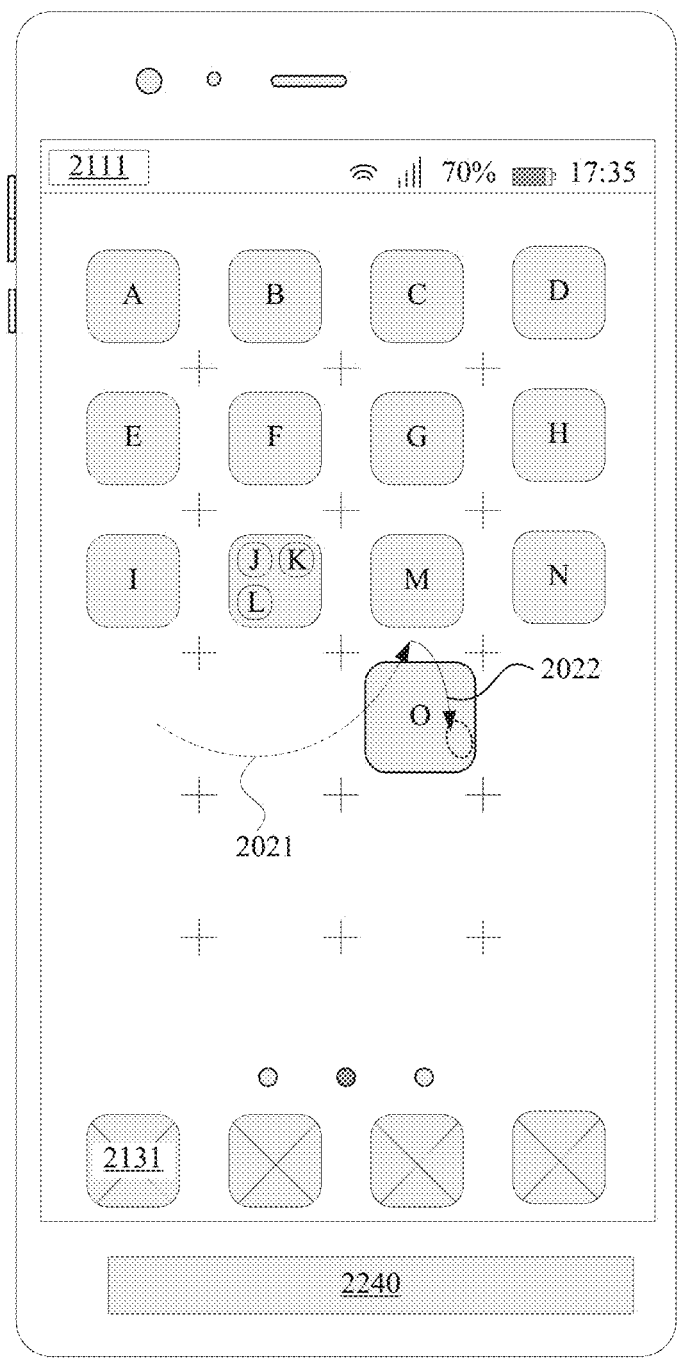
Figures 2, 2C, 3, 4:
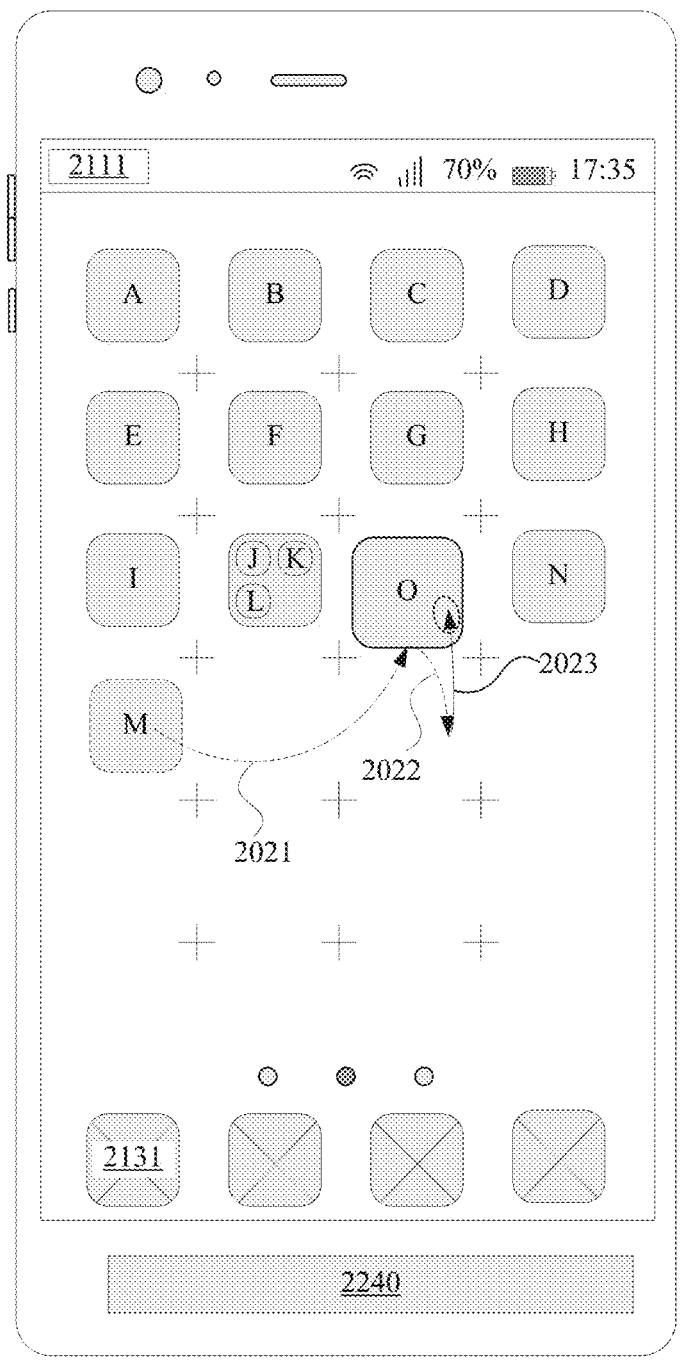
Figures 2, 2C, 3, 4, 5:
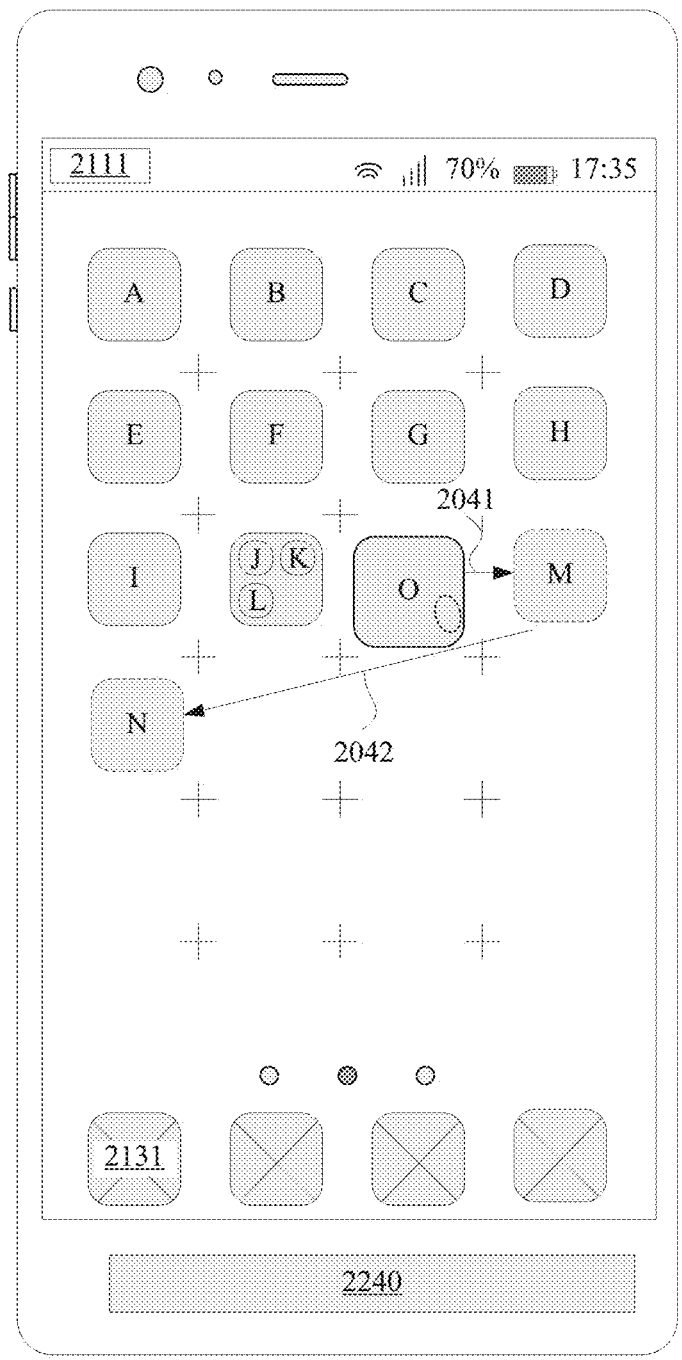

FIG. 2C-3 shows another example of a mobile phone during editing of a user interface. Referring step S330c-1 in FIG. 3, the processor unit 102 determines, after the icon O following the touch point of the user is most correlated with the icon M, that the touch point of the user continues to move along a track 2022 whose direction is opposite to the track 2021 to make the icon O move away from the icon M until the icon O is not most correlated with the icon M.

FIG. 2C-4 shows still another example of a mobile phone during editing of a user interface. Referring to step S330c-2 in FIG. 3, the processor unit 102 determines, after the icon O following the touch point of the user moves along the track 2022 and the icon O is made not correlated with the icon M, that the icon O moves along the track 2023 whose direction is opposite to the track 2022, and when the icon O is most correlated with the icon M again, the processor unit 102 places the icon O at a location of the icon M and moves the icon M to another location, for example, an original location of the icon O or an empty location on a current page. The processor unit 102 controls the touchscreen 2100 to display a process in which the locations of the icon O and the icon M change and the user interface after the change.

When the icon O is most correlated with the icon M, the processor unit 102 may replace the locations of the icon O and the icon M in the user interface; or move the icon O to the location of the icon M and move the icon M to another location. In this case, the touch point of the user may still not be terminated. Therefore, the icon O may still be displayed in a highlighted manner. When the touch point of the user is terminated, the icon O is recovered to a state that is the same as a state of another icon. Alternatively, when the icon O is most correlated with the icon M, the icon O may be displayed in a highlighted manner, and after the touch point of the user is terminated, the locations of the icon O and the icon M in the user interface are replaced; or the icon O is moved to the location of the icon M and the icon M is moved to another location; or the icon O and the icon M may be recovered to the state that is the same as the state of another icon.

It should be further noted that the moving the icon M to another location may refer to sequentially moving the icon M and icon o on to the right of and below the icon M by one location in a left-to-right or top-to-bottom order. As shown in FIG. 2C-5, the icon M is moved by one location along a route 2041 and the icon N is moved by one location along a route 2042. Alternatively, the second icon is randomly moved to any empty location, such as any square in which no icon is displayed in FIG. 2C-5, in the user interface.

Figures 1, 2D:
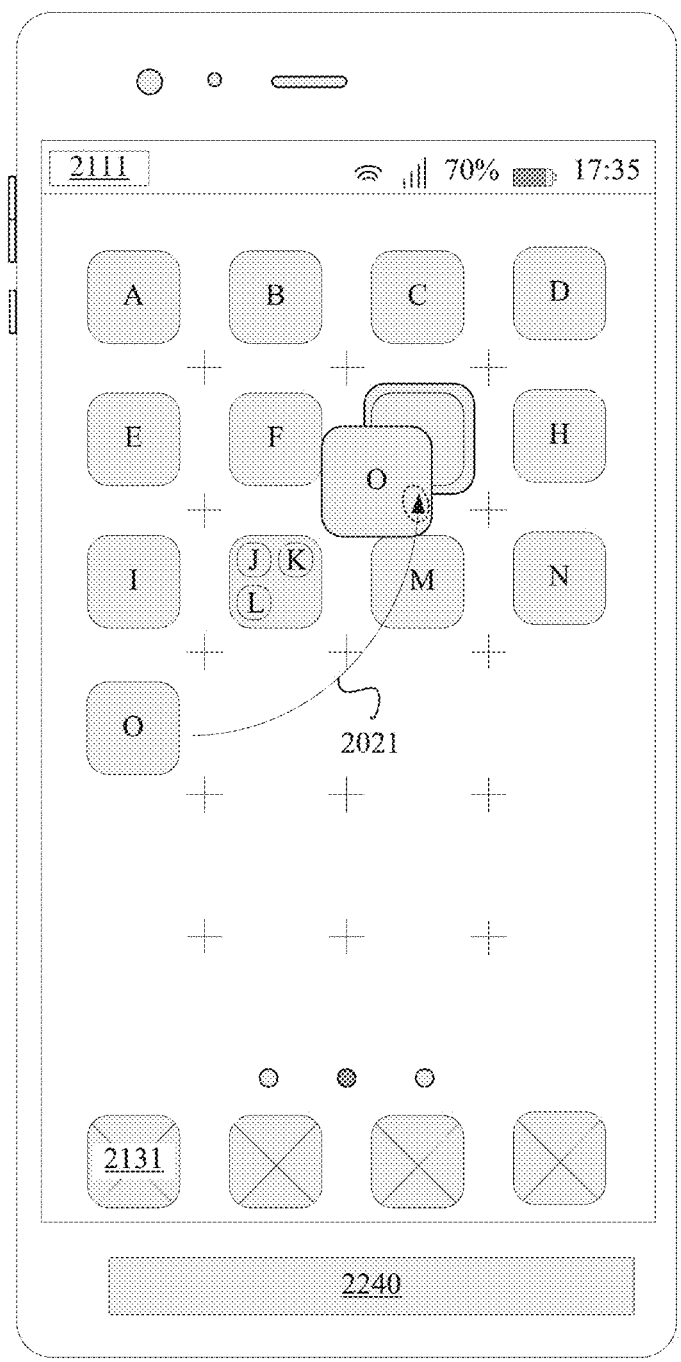
Figures 2, 2D:
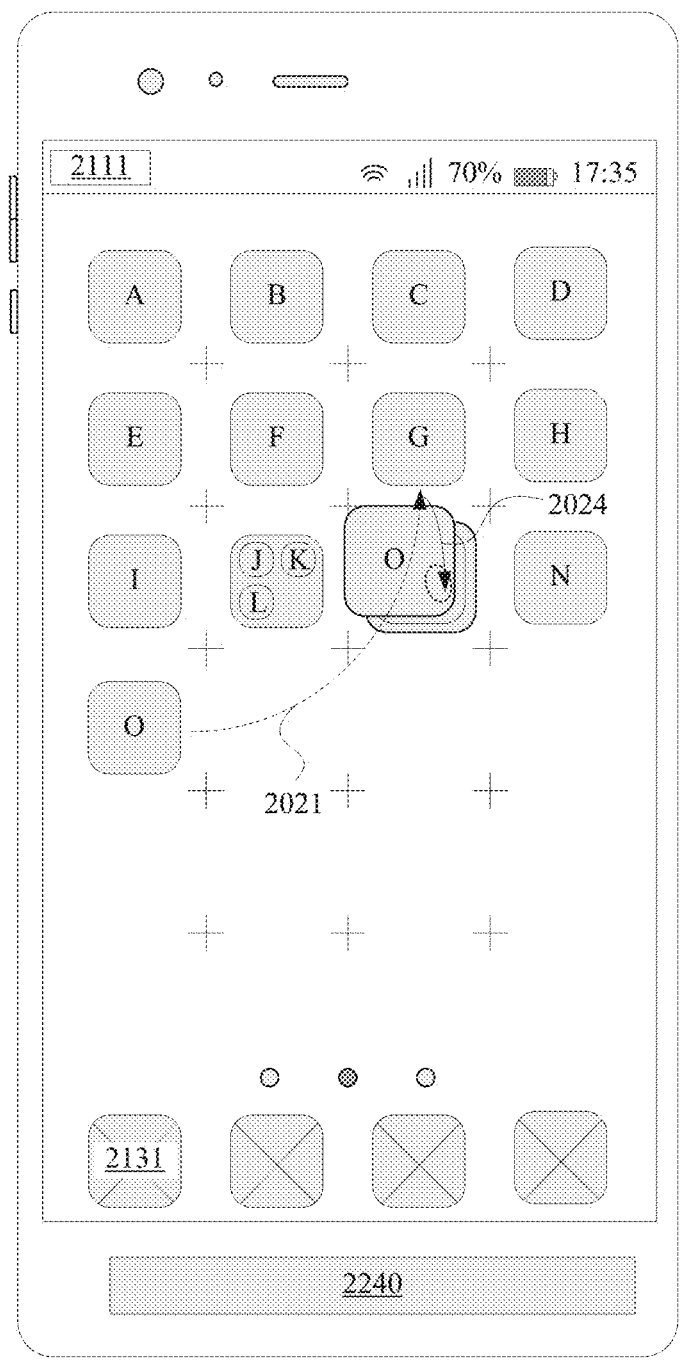
Figures 2, 2D, 3:
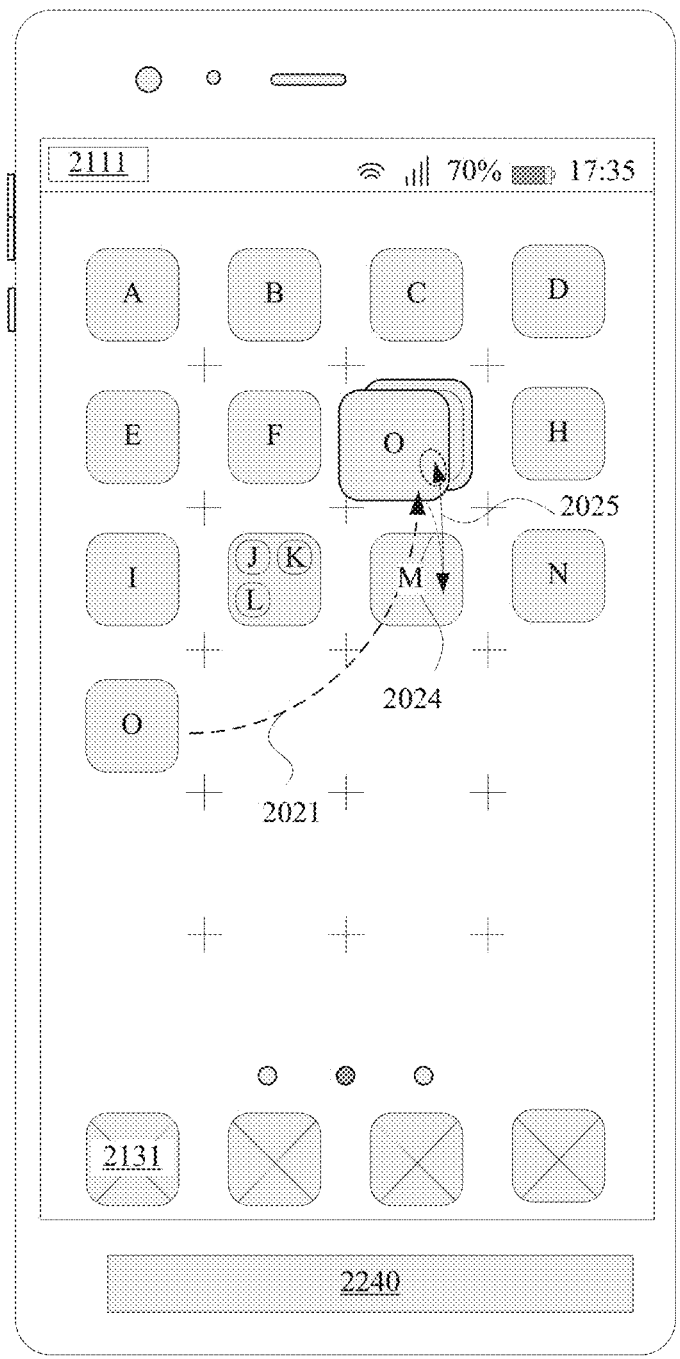
Figure 3:
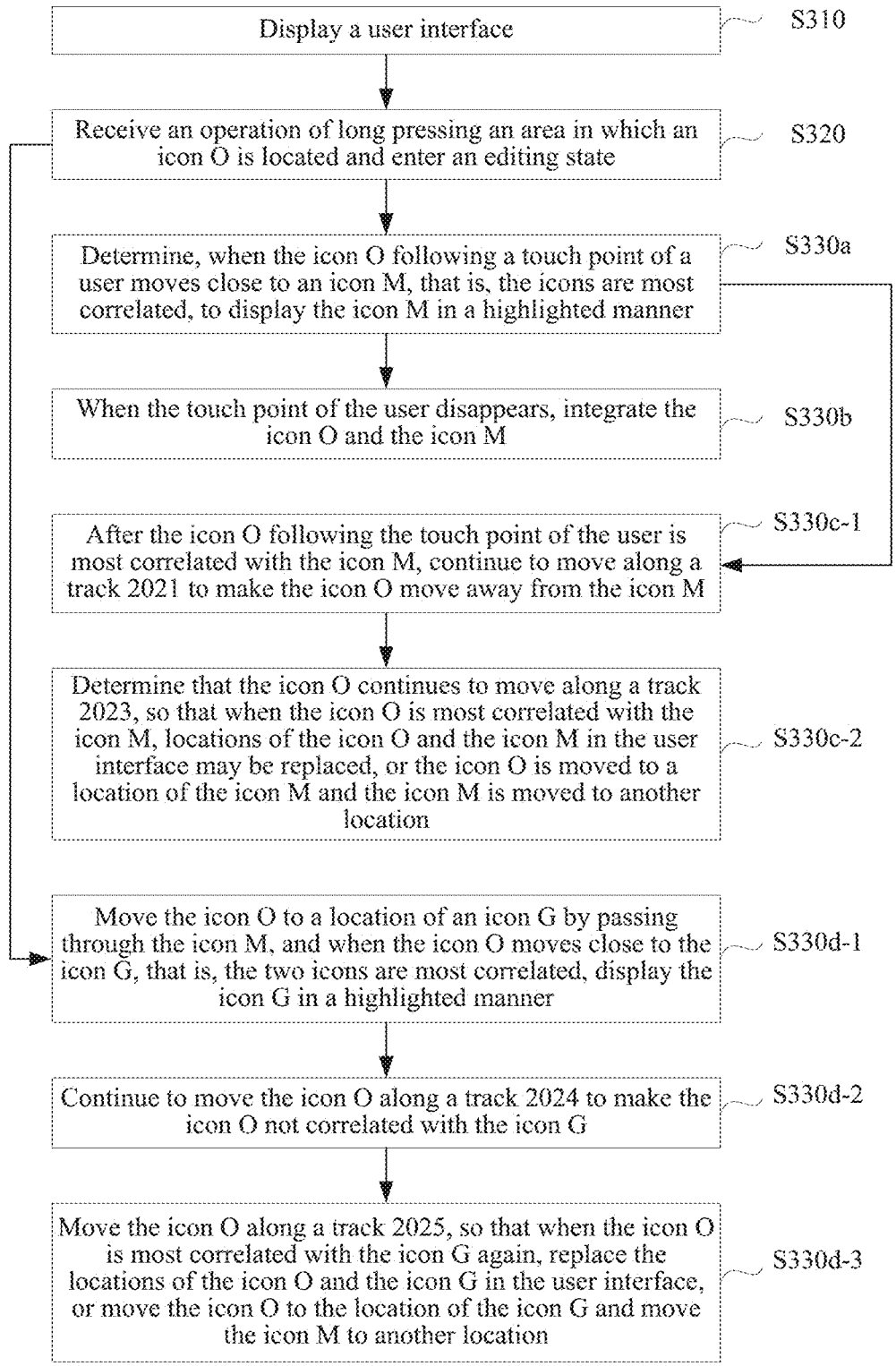

FIG. 2D-1 shows yet another example of a mobile phone during editing of a user interface. Referring to step S330d-1 in FIG. 3, when the touch point of the user moves on the touchscreen of the mobile phone along the track 2021, the processor unit 102 determines a track along which the icon O following the touch point of the user continues to move to a location of the icon G through the icon M, and controls, when the icon O moves close to the icon G and the two icons are most correlated, the touchscreen 2100 to display the icon G in a highlighted manner (such as highlighting or zooming).

In this case, the processor unit 102 determines, when the touch point of the user is terminated, to directly integrate the icon O and the icon G.

FIG. 2D-2 shows yet another example of a mobile phone during editing of a user interface. Referring step S330d-2 in FIG. 3, the processor unit 102 determines, after the icon O that follows the touch point of the user and that moves along the track 2021 is most correlated with the icon G, that the touch point of the user moves along a track 2024 whose direction is opposite to the track 2021 again to make the icon O be not most correlated with the icon G.

In this case, the icon O may be most correlated with another icon, for example, the icon M. When the touch point of the user is terminated, the icon O and the icon M that is most correlated with the icon O are integrated.

FIG. 2D-3 shows yet another example of a mobile phone during editing of a user interface. Referring to step S330d-3 in FIG. 3 and based on the foregoing embodiment, the processor unit 102 determines, after the icon O following the touch point of the user moves along the track 2021, that the icon O moves along a track 2025 whose direction is opposite to the track 2024, and when the icon O is made most correlated with the icon G again, the processor unit 102 may move the icon O to a location of the icon G and move the icon G to another location. For example, the processor unit 102 moves the icon G to the original location of the icon O.

In this embodiment of the present invention, the track 2021 may be considered as a first track, the track 2022 and the track 2024 may be separately considered as a second track, and the track 2023 and the track 2025 may be separately considered as a third track.

In an optional implementation manner of the present invention, after a first icon is most correlated with a second icon along the first track and maintains the most correlated state for a period of time, the first icon may be moved along the second track whose direction is opposite to a direction of the first track. When the first icon is moved along the third track whose direction is the same as the direction of the first track, and the first icon is most correlated with the second icon again and maintains the most correlated state for a period of time, the foregoing operation is performed again on the first icon and the second icon. The period of time may be determined according to a habit of the user. For example, the period of time may be set to one second.

A person skilled in the art should know that FIG. 2A to FIG. 2D are described merely by using an example in which the icon O is used as the first icon. Similar to the icon O, another icon may also be used as the first icon for a same operation. For brevity, details are not described herein again.

By means of the embodiments of the present invention, when moving an icon in a user interface, a user does not need to consider a speed at which the icon is moved, but only needs to control a quantity of times when a first icon and a second icon are most correlated, so that "quantitative" control in the existing solution is changed to "qualitative" control, thereby reducing a possibility of an incorrect operation and improving user experience.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method for displaying an icon, comprising:
    displaying a user interface on a display panel of an electronic device, wherein the user interface comprises a plurality of icons including a first icon and a second icon;
    receiving a first operation of a user;
    in response to the first operation, enabling the first and second icons of the electronic device to enter an editing state;
    receiving a dragging operation of the user;
    in response to a first portion of the dragging operation, moving the first icon along a first track approaching the second icon;
    determining a correlation between the first icon and the second icon during the movement of the first icon along the first track;
    after determining that the first icon is most correlated with the second icon, displaying the second icon in a highlighted manner;
    in response to the dragging operation being terminated without the first icon being further moved such that the first icon is no longer most correlated with the second icon, displaying a folder in the user interface and integrating the first icon and the second icon in the folder; and
    in response to a second portion of the dragging operation without termination of the dragging operation:
        first moving the first icon away from the second icon along a second track, and then moving the first icon towards the second icon along a third track while maintaining the second icon in the highlighted manner; and
        when the first icon is most correlated with the second icon again along the third track, moving the first icon to a location of the second icon and moving the second icon to another location.

2. The method according to claim 1, wherein the method further comprises:
    determining that the first icon is most correlated with the second icon when a center distance between the first icon and the second icon is the shortest compared with center distances between the first icon and other icons.

3. The method according to claim 1, wherein the method further comprises:
    determining that the first icon is most correlated with the second icon when an overlapping area between the first icon and the second icon is the largest.

4. The method according to claim 1, wherein the method further comprises:
    determining that the first icon is most correlated with the second icon when the first icon and the second icon are overlapped and a motion direction of the first track points to the second icon.

5. The method according to claim 1, wherein a motion direction of the second track is opposite to a motion direction of the first track, and a motion direction of the third track is the same as the motion direction of the first track.

6. The method according to claim 5, wherein an angle between the motion direction of the second track and the motion direction of the first track is greater than 90°, and an angle between the motion direction of the third track and the motion direction of the first track is less than 90°.

7. The method according to claim 1, wherein moving the second icon to another location comprises:
    sequentially moving the second icon and icons on the right of and below the second icon by one location in a left-to-right or top-to-bottom order.

8. The method according to claim 1, wherein moving the second icon to another location comprises:
    randomly moving the second icon to any empty location in the user interface.

9. An electronic device, comprising:
    a processor; and
    a memory storing instructions that, when executed by the processor, cause the electronic device to:
        display a user interface on a display panel of the electronic device, wherein the user interface comprises a plurality of icons including a first icon and a second icon;
        receive a first operation of a user;
        in response to the first operation, enable the first and second icons of the electronic device to enter an editing state;
        receive a dragging operation of the user;
        in response to a first portion of the dragging operation, move the first icon along a first track towards the second icon;
        determine a correlation between the first icon and the second icon during the movement of the first icon along the first track;
        after determining that the first icon is most correlated with the second icon, display the second icon in a highlighted manner;

in response to the dragging operation being terminated without the first icon being further moved such that the first icon is no longer most correlated with the second icon, display a folder in the user interface and integrate the first icon and the second icon in the folder; and in response to a second portion of the dragging operation without termination of the dragging operation:
first move the first icon away from the second icon along a second track, and then move the first icon towards the second icon along a third track while maintaining the second icon in the highlighted manner; and when the first icon is most correlated with the second icon again along the third track, move the first icon to a location of the second icon and move the second icon to another location.

10. The electronic device according to claim 9, wherein the instructions, when executed by the processor, further cause the electronic device to:
determine that the first icon is most correlated with the second icon when a center distance between the first icon and the second icon is the shortest compared with center distances between the first icon and other icons.

11. The electronic device according to claim 9, wherein the instructions, when executed by the processor, further cause the electronic device to:
determine that the first icon is most correlated with the second icon when an overlapping area between the first icon and the second icon is the largest.

12. The electronic device according to claim 9, wherein the instructions, when executed by the processor, further cause the electronic device to:
determine that the first icon is most correlated with the second icon when the first icon and the second icon are overlapped and a motion direction of the first track points to the second icon.

13. The electronic device according to claim 9, wherein a motion direction of the second track is opposite to a motion direction of the first track, and a motion direction of the third track is the same as the motion direction of the first track.

14. The electronic device according to claim 13, wherein an angle between the motion direction of the second track and the motion direction of the first track is greater than 90°, and an angle between the motion direction of the third track and the motion direction of the first track is less than 90°.

15. The electronic device according to claim 9, wherein the instructions, when executed by the processor, further cause the electronic device to:
sequentially move the second icon and icons on the right of and below the second icon by one location in a left-to-right or top-to-bottom order.

16. The electronic device according to claim 9, wherein the instructions, when executed by the processor, further cause the electronic device to:
randomly move the second icon to any empty location in the user interface.

* * * * *